United States Patent [19]

Beard

[11] 4,328,574
[45] May 4, 1982

[54] APPARATUS AND METHOD FOR DETECTING CROSSMODULATION DISTORTION

[76] Inventor: Terry D. Beard, 2471 Sapra St., Thousand Oaks, Calif. 91360

[21] Appl. No.: 82,662

[22] Filed: Oct. 9, 1979

[51] Int. Cl.³ .............................................. G11B 7/00
[52] U.S. Cl. ........................................ 369/54; 369/58
[58] Field of Search ................. 179/100.3 P, 100.3 B, 179/100.3 D, 100.3 T, 100.3 R; 356/429, 430; 369/54, 58

[56] References Cited

U.S. PATENT DOCUMENTS

| | | | |
|---|---|---|---|
| 1,769,908 | 7/1930 | De Forest | 179/100.3 T |
| 2,538,354 | 1/1951 | Corcoran et al. | 179/100.3 P |
| 3,728,495 | 4/1973 | Vlahos | 179/100.3 P |
| 4,044,207 | 8/1977 | Vlahos | 179/100.3 B |

OTHER PUBLICATIONS

Tremaine, Audio Cyclopedia, 2nd Ed., Sections 18.225-18.299, pp. 970-1,000, 1977.

Primary Examiner—Raymond F. Cardillo, Jr.
Attorney, Agent, or Firm—Richard S. Koppel

[57] ABSTRACT

A method and apparatus for detecting crossmodulation distortion on an optical sound track by detecting variations in the light transmitted through a predetermined area on the sound track, the predetermined area being selected such that its transmittance varies substantially only with the amount of crossmodulation distortion on the sound track. The predetermined area preferably has a dimension along the sound track which is a whole number multiple of, and substantially greater than, the wavelength of a high frequency test signal. Light is also transmitted through a second predetermined area on the sound track which clips the high frequency test signal, thereby providing a low frequency phase reference for determining the relative exposure of the film. In an alternate embodiment, the predetermined areas are divided into primary and secondary areas, mutually spaced by a distance which is out-of-phase with respect to the wavelength of a low frequency test signal. Crossmodulation distortion information is obtained by comparing the light transmitted through both areas. Instead of single predetermined areas, multiple areas spaced by whole number multiples of the low frequency signal wavelength can be used to improve the resolution of the system's frequency response. A mask with defined apertures controls the light paths. Testing for crossmodulation distortion can be done by simply moving the film by hand a short distance through the test equipment. Because crossmodulation is continuously monitored, diagnostic testing is also possible.

34 Claims, 10 Drawing Figures

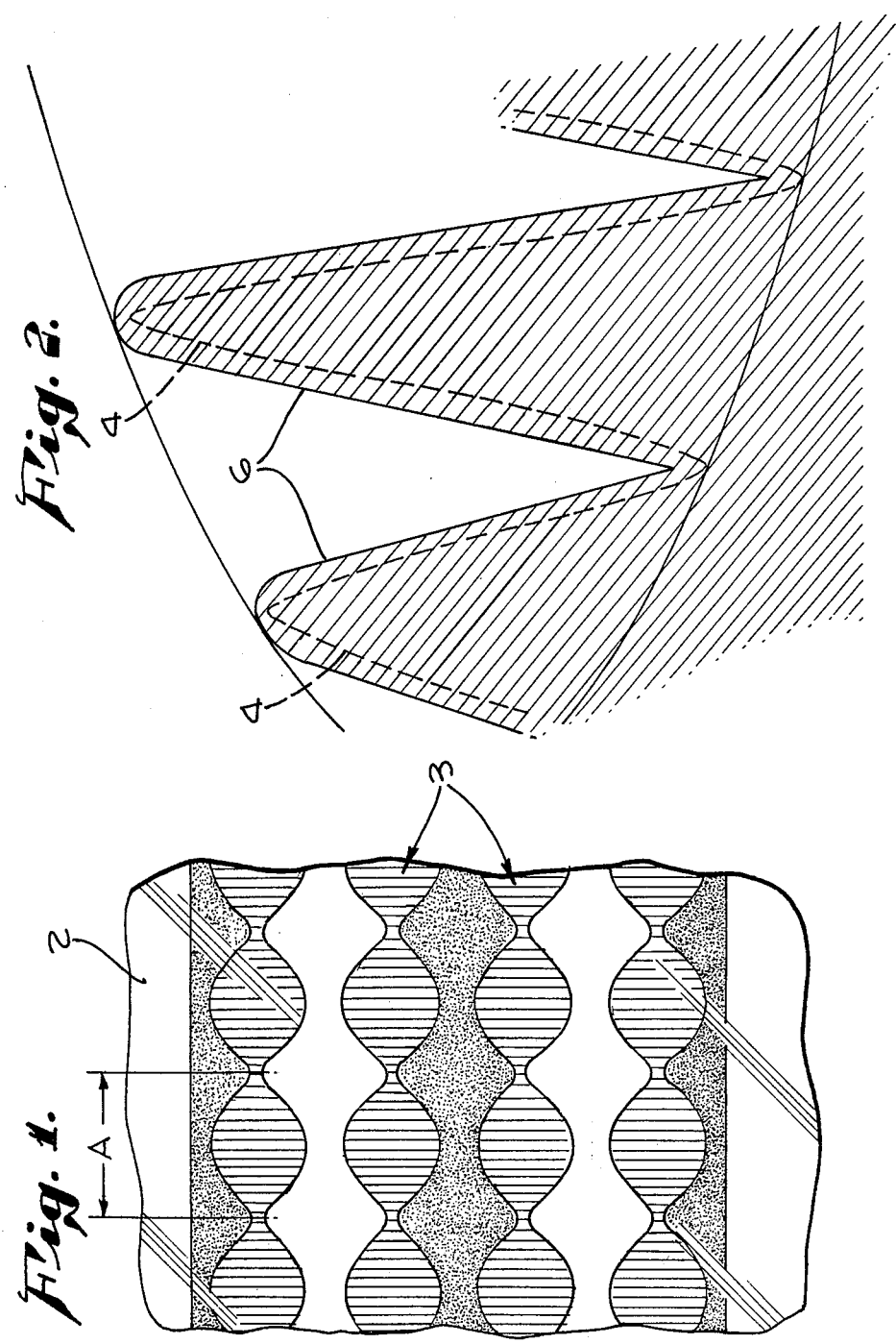

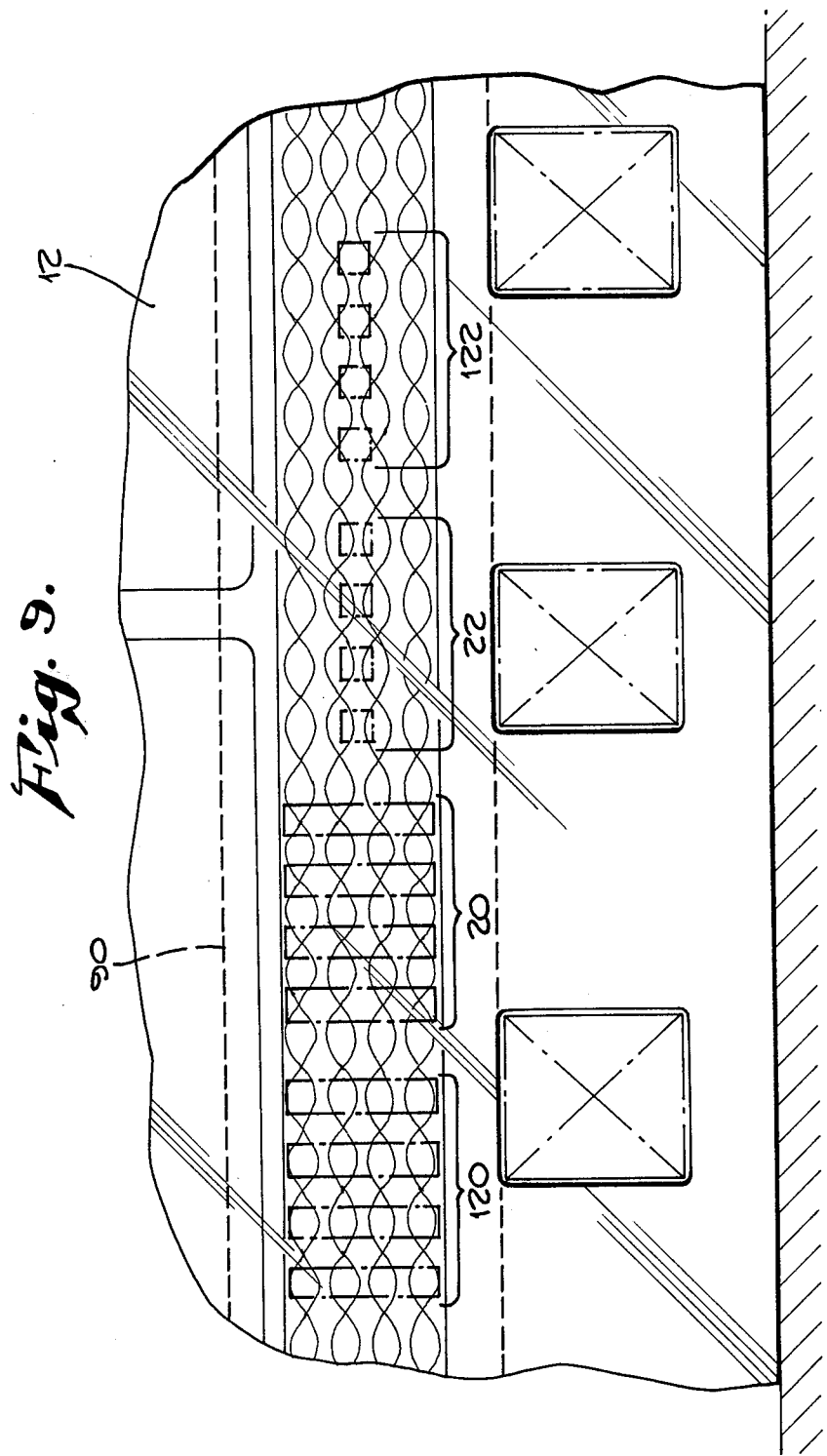

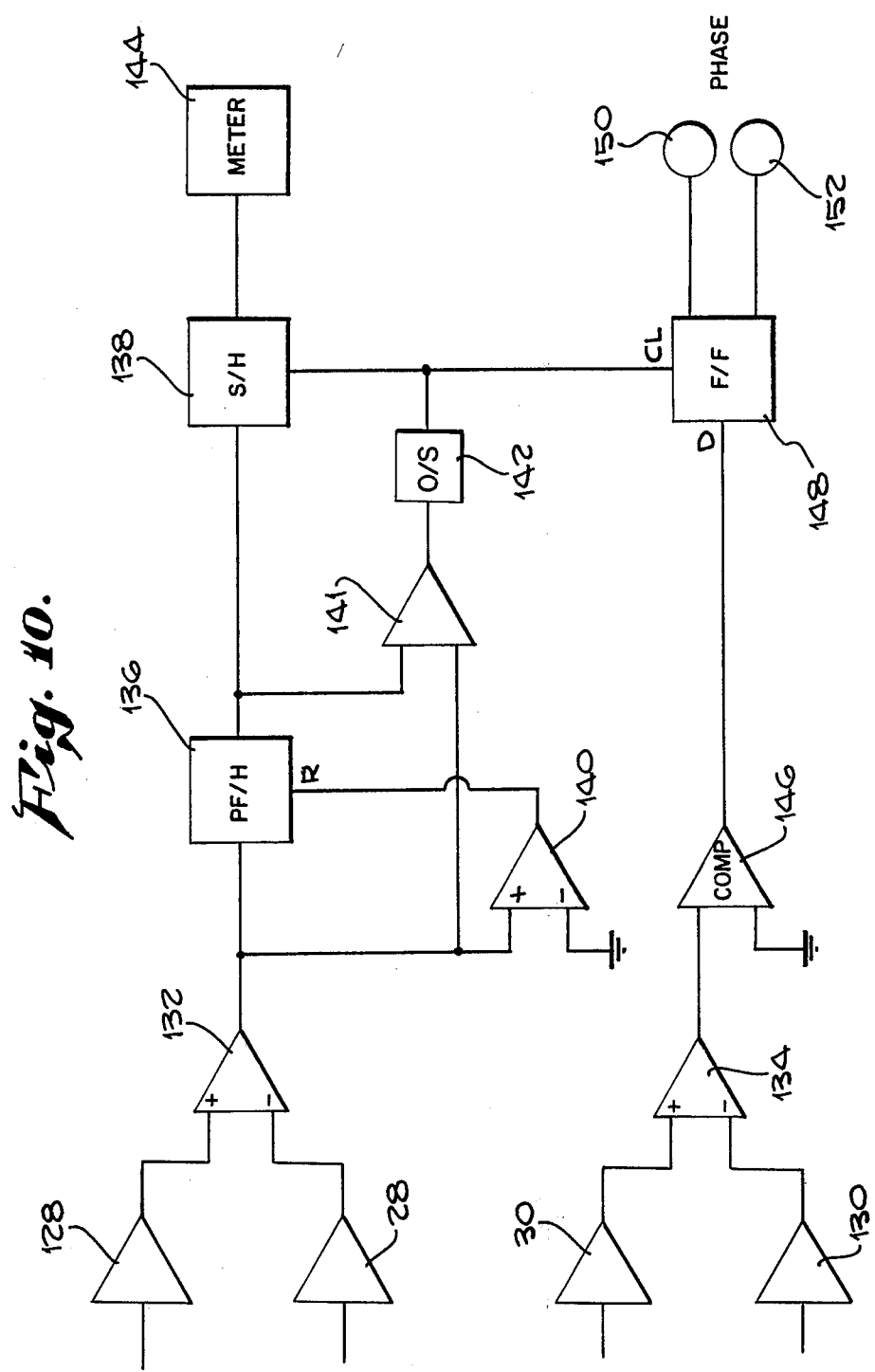

APPARATUS AND METHOD FOR DETECTING CROSSMODULATION DISTORTION

BACKGROUND OF THE INVENTION

1. Field of the Invention

This invention relates to sound recording for motion pictures, and more particularly to a method and apparatus for detecting crossmodulation distortion on optical sound tracks.

2. Description of the Prior Art

Variable area motion picture sound tracks exhibit a form of distortion peculiar to optical sound tracks if the negative and print are not exposed and developed properly. Such distortion is known as crossmodulation distortion. The common method of testing for crossmodulation distortion involves the recording of a high frequency test signal, amplitude modulated by a low frequency test signal on the optical sound track. For 35 mm motion picture sound tracks, 8000–9000 hertz and 400 hertz are commonly used for the high and low frequency test signals, respectively.

A segment of a film strip 2 having recorded thereon such a test sound track in dual bilateral format is shown in FIG. 1. One wavelength of the low frequency test signal is denoted by dimension A. The amplitude modulated high frequency test signal appears within each lobe 3 of the low frequency signal.

If there is no crossmodulation distortion, only the originally recorded signal with frequencies present only around the high frequency test signal will be present when the sound track is played back. For example, with a high frequency signal of 9,000 hertz and conventional amplitude modulation used to create the crossmodulation signal, the resultant frequencies will be at 8,600, 9,000 and 9,400 hertz. The presence of crossmodulation distortion results in the presence of not only the above three frequencies during playback, but also a spurious signal at 400 hertz. FIG. 2 depicts an enlarged portion of the high frequency test signal image. For zero crossmodulation distortion, the test signal appears as an amplitude modulated sine wave, shown in dashed lines 4. The portion of the sound track within this signal envelope is darkened, as indicated by the diagonal lining. The presence of crossmodulation distortion causes the image boundary to shift, for example to the boundary indicated by solid line 6. In this case the lined area between lines 4 and 6 would also be dark on the sound track, distorting the recorded signal and leading to lower quality sound reproduction.

If both the recording and printing of the crossmodulation test signals are done properly, the amplitude modulated signal will play back as recorded and the sound track will exhibit no distortion. If, however, either the recording or printing was imperfect, the playback will contain a residual crossmodulation signal having a frequency equal to that of the low frequency modulating signal. The level of the spurious residual signal provides a measure of the distortion level. Its phase relative to the phase of the low frequency modulating test signal indicates whether the print and/or negative has been overexposed or underexposed.

The crossmodulation distortion test that has been used in the industry involves the recording of several feet of test signal on a film, and then running the film through a conventional optical sound track playback device at a controlled speed to measure the crossmodulation distortion signal with a filter tuned to the frequency of the low frequency modulating signal. Because this technique is cumbersome and time consuming, it is performed only infrequently. Furthermore, it provides only an average indication of crossmodulation distortion, rather than a continuous indication of the distortion level at discrete locations along the track. This can result in certain crossmodulation distortion being missed, and also severely limits the usefulness of the testing technique as a diagnostic tool for determining the cause of the distortion. Further details on crossmodulation distortion testing may be obtained from a publication by Howard M. Tremaine, *Audio Cyclopedia*, sections 18.283–18.299, Howard W. Sams & Co., 1977 (2d edition).

SUMMARY OF THE INVENTION

In view of the above problems associated with the prior art, an object of the present invention is the provision of a method and apparatus for performing a quick and easy test for crossmodulation distortion on an optical sound track, without having to run the film through an optical playback system. The testing of every print would thereby be encouraged as a routine quality control step.

Another object is the provision of a method and apparatus for continuous testing for crossmodulation distortion along the length of a test strip, thereby enabling the use of the test as a diagnostic tool.

An additional object is the provision of a method and apparatus for testing for crossmodulation distortion which requires only a small amount of film to be devoted to a test strip, and which eliminates the need to precisely control the speed of the film through the testing apparatus.

Still another object is the provision of a method and apparatus for determining whether a film exhibiting crossmodulation distortion has been overexposed or underexposed.

The above objects are accomplished according to the present invention by a method and apparatus for directing light through specified portions of an optical test sound track, such that useful information on crossmodulation distortion is obtained by monitoring the light transmitted through the film during relative movement between the film and light path. For zero crossmodulation distortion, the amount of light transmitted through the film exhibits zero or minimum variation; increasing amounts of crossmodulation distortion produce increasing amounts of variation in the amount of transmitted light. In the preferred embodiment, light is directed through an area on the film having a dimension along the sound track substantially equal to a whole number multiple of the wavelength of the high frequency test signal, and approximately one-half the wavelength of the low frequency modulating signal. With an illuminated film area having large dimensions relative to the high frequency wavelength and poor edge sharpness, the amount of transmitted light is made substantially independent of the high frequency signal. It varies, instead, only in response to track density variations at the frequency of the low frequency modulating signal, thereby facilitating a determination of the crossmodulation distortion.

To ascertain the phase of the residual crossmodulation distortion signal relative to the low frequency test signal, and thereby the relative exposure of the film, light is directed to a second light detector through a second area of the sound track. The second area is selected such that the light received by the second light detector varies, as the film is moved, at the periodicity of the low frequency modulating test signal and in known phase relationship therewith. The second area is displaced from the first area on the film by a predetermined distance, preferably an integral number of half periods of the low frequency modulating signal. It thereby provides a phase reference for the residual crossmodulation distortion signal whereby the relative exposure of the film can be determined.

Rather than directing light through single areas on the film, light can be directed through a plurality of discrete areas which are mutually spaced along the sound track by whole number multiples of the wavelength of the low frequency test signal. The bandwidth of the detecting apparatus is narrowed as more areas on the sound track are illuminated, thereby rejecting more spurious signals at wavelengths other than that of the residual crossmodulation signal being measured.

In another embodiment of the invention, the measurement of both crossmodulation distortion and phase is accomplished by directing light through primary and secondary areas on the sound track. The primary and secondary areas are mutually spaced by a predetermined distance which is out-of-phase with respect to the wavelength of the low frequency test signal. The pattern of out-of-phase variations in light transmittance detected through the primary and secondary areas provides an indication of the distortion level. A second, similarly spaced set of primary and secondary areas, selected to rectify the high frequency test signal and thereby provide a phase reference for the distortion signal, can also be illuminated. Again, light can be passed through a plurality of spaced areas on the film for both measurement of crossmodulation distortion and phase reference, to enhance frequency response.

The invention also comprehends the use of an opaque mask member to provide the light control function. The mask member is positioned in the light path, and has apertures which enable the transmission of light between the light source and detector only through the desired areas of the film sound track.

Additional objects and advantages of the invention will be recognized by those skilled in the art from a consideration of the following detailed description of various preferred embodiments, together with the appended drawings.

DESCRIPTION OF THE DRAWINGS

FIG. 1 is an enlarged elevation plan view of a typical sound track with high crossmodulation distortion test signals on a portion of film strip;

FIG. 2 is a further enlarged illustration of a portion of the high frequency test signal depicted in FIG. 1, showing the effects of crossmodulation distortion;

FIGS. 8 and 9 are plan views similar to FIGS. 4 and 5, respectively showing a mask member suitable for use with the embodiment illustrated in FIG. 7, and such mask member positioned below a test sound track; and FIG. 10 is a schematic diagram of output circuitry for the embodiment of the invention shown in FIG. 7.

DETAILED DESCRIPTION OF PREFERRED EMBODIMENTS

Figure 3:
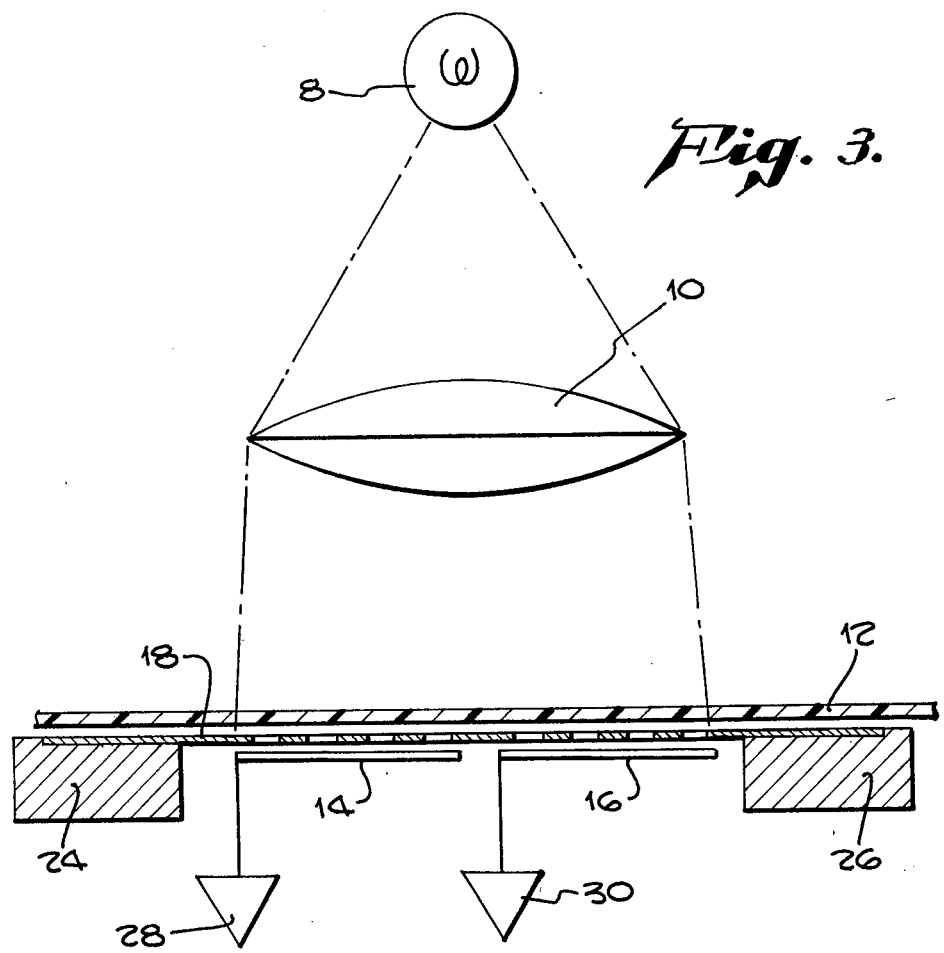
FIG. 3 is an elevation view illustrating the arrangement of components in one embodiment of the invention.

Referring to FIG. 3, one embodiment of the subject apparatus for detecting crossmodulation distortion is shown. Light from a light source 8 is directed through a collimating lens 10 onto a film strip 12 having a conventional optical sound track with a high frequency test signal modulated by a low frequency test signal. Positioned below film strip 12 are first and second light detectors 14 and 16, respectively, which produce electrical outputs in proportion to the amount of incident light. Detectors 14 and 16 may comprise conventional photocells.

An opaque mask member 18 is positioned between film 12 and detectors 14 and 16 to control the transmission of light from lens 10 onto the light detectors. Mask member 18 has a series of apertures arranged in groups or cells generally indicated by reference numerals 20 and 22, which apertures determine the permissible light path between light source 8 and detectors 14 and 16. The size and position of the apertures are selected such that only light which passes through desired target areas on the sound track is transmitted to the light detectors, all light outside of the desired target areas being excluded from the light path between source 8 and detectors 14 and 16. Support members 24 and 26 hold mask 18 in place, while amplifiers 28 and 30 are respectively connected to detectors 14 and 16 to amplify the signals representing the amount of light received by the detectors.

Figure 4:
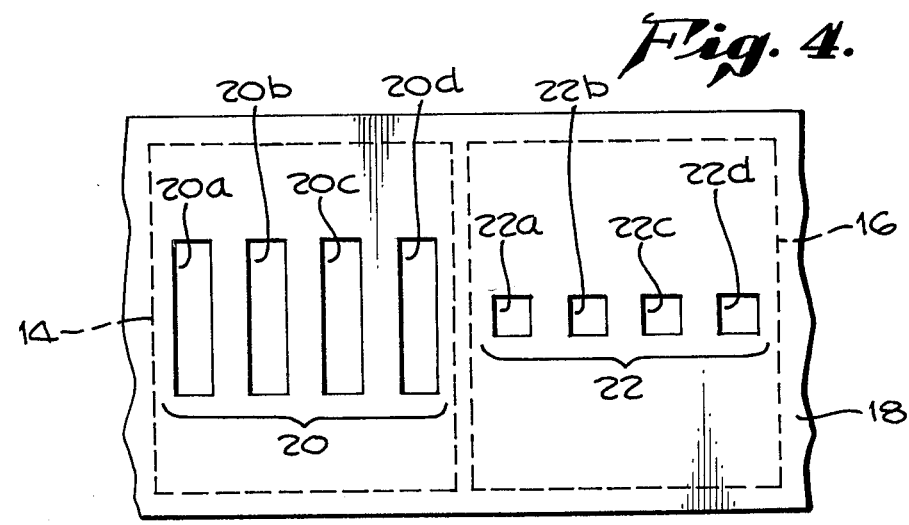
FIG. 4 is a plan view of a mask member suitable for use with the embodiment shown in FIG. 3.

Mask 18, an enlarged plan view of which is shown in FIG. 4, is preferably formed from a thin sheet metal such as 0.004 inch thick berrylium copper foil. It is held below the film, preferably with a spacing of about 10 to 20 thousands of an inch between the mask and film. Alternately, mask 18 could be positioned above the film, or other means can be envisioned for insuring that only light which is transmitted through the desired target areas of the sound track reaches detectors 14 and 16.

As shown in FIG. 4, the first group of apertures 20 consists of four elongated apertures 20a, 20b, 20c and 20d, while the second group of apertures 22 consists of four generally square apertures 22a, 22b, 22c and 22d. As explained below, aperture group 20 controls the light transmitted to detector 14 so as to provide an indication of the magnitude of crossmodulation distortion, while aperture group 22 controls the light transmitted to detector 16 so as to provide an indication of the relative phase of the crossmodulation distortion, and thus of the film's exposure. While four separate apertures are shown in each group 20 and 22, the advantages of the invention can be obtained with only a single aperture in each group. However, the use of multiple apertures enhances the frequency resolution of the system by narrowing its reponse bandwidth, which is centered around the frequency of the low frequency modulating test signal. Furthermore, aperture group 22 may be omitted entirely; aperture group 20 will still provide an indication of the magnitude of the crossmodulation distortion, although no information will be provided regarding its phase.

Figure 5:
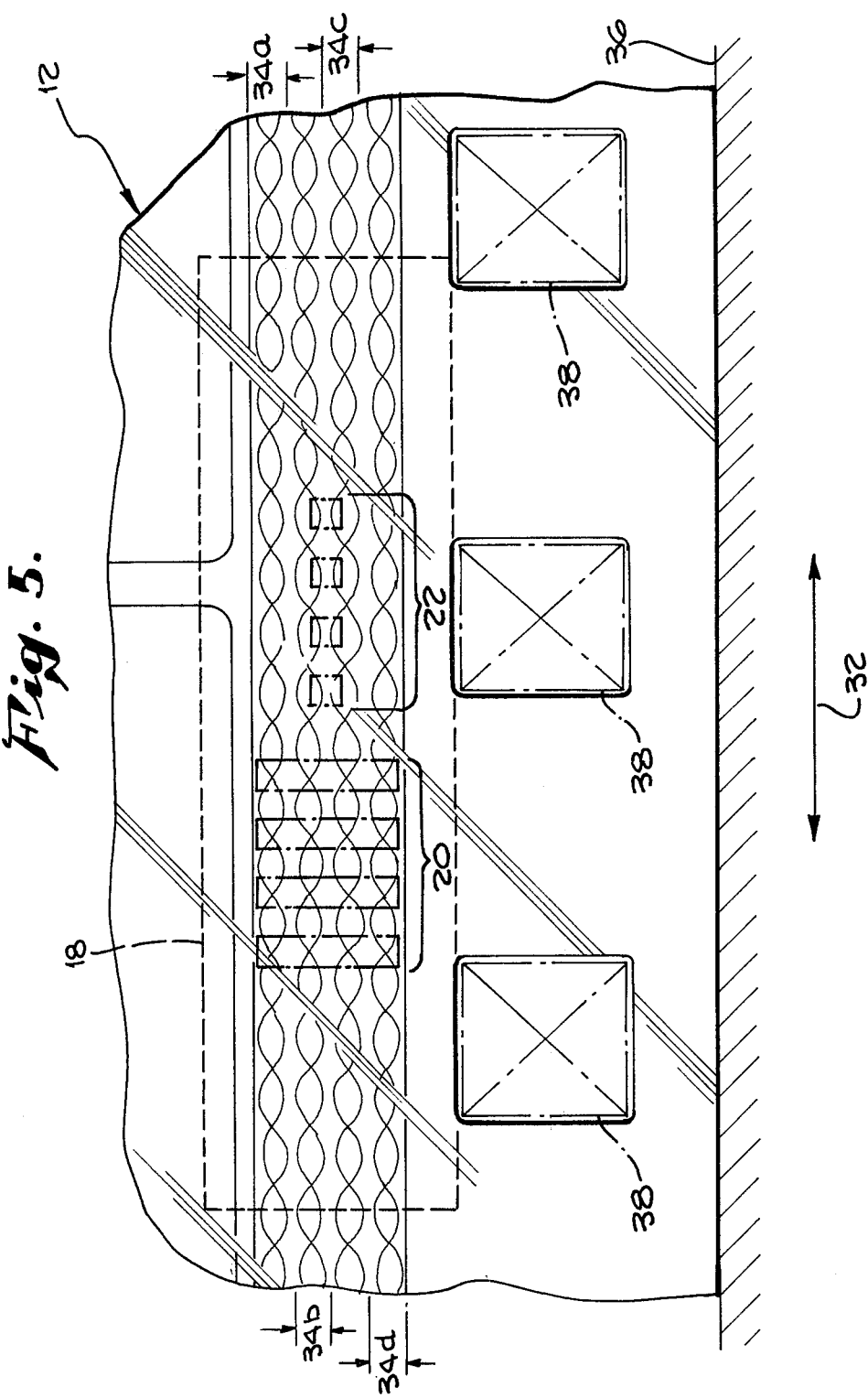
FIG. 5 is a plan view of the mask member shown in FIG. 4 positioned below overlying the test sound track.

Referring now to FIG. 4 in conjunction with FIG. 5, the apertures of mask member 18 are shown in relation to a test sound track. In FIG. 5 it is assumed that the light follows a generally collimated path through the film and mask member to the light detector, and that each of these elements are aligned so that the aperture areas are equal to the target areas on the film. Adjustment of the aperture dimensions would be required should the light follow a coverging or diverging rather than a collimated path, or if the film and mask member were out of alignment with respect to the light source. The critical factor is that the light eventually reaching the detectors represent only that light which is transmitted through the desired target areas of the film.

The light from lens 10 is not preferably collimated, but rather is somewhat fuzzy at its edges. This, together with the fact that Light is transmitted along an area of the sound track which is substantially greater than the wavelength of the high frequency test signal, minimizes and ideally eliminates any variation in transmittance due to the high frequency components of the crossmodulation signal.

Each of the first target areas on the film included in the controlled light path, corresponding to apertures 20a-20d, are characterized by a dimension along the sound track (parallel to axis line 32) which is preferably substantially equal to a whole number multiple of the high frequency signal wavelength. In the transverse direction across the sound track, apertures 20a-20d encompass a whole number of signal bands, a signal band being defined herein as the smallest unit across the sound track to transmit an amount of light which is constantly proportional to the light transmitted across the entire sound track as the film is moved under the incident light. There are four signal bands 34a, 34b, 34c and 34d on the sound track shown in FIG. 5.

With the widths of apertures 20a-20d equal to a whole number multiple of the high frequency test signal wavelength and an extended light source, the amount of light transmitted to detector 14 will remain substantially constant if a distortion-free sound track is passed through the light path. Since the effect of crossmodulation distortion on the amount of light transmitted through the sound track becomes most pronounced at the areas of the sound track where the modulated high frequency signal reaches maximum amplitude and becomes correspondingly least pronounced where the high frequency signal is at minimum amplitude, the amount of light transmitted through the sound track and mask combination will vary in proportion to the degree of crossmodulation distortion present as the sound track is passed through the light path.

Apertures 22a-22d Provide a phase reference for the signals corresponding to the light transmitted through apertures 20a-20d. They are positioned on the mask to extend partially into a high frequency signal portion of the sound track, thereby clipping the high frequency signal so as to deliver to detector 16 a rectified light signal which varies in amplitude at the frequency of the low frequency test signal. While apertures 22a-22d are positioned over the center of the sound track in FIG. 5, they could also be placed along the edges of the sound track or at any other position that would clip the high frequency test signal so as to provide a phase reference for the low frequency test signal. Phase reference apertures 22a-22d could be spaced respectively by any known distance from apertures 20a-20d within the limits of the sound track. However, it is preferable for convenience of output analysis that the crossmodulation distortion signal obtained through apertures 20a-20d be either directly in-phase or 180 degrees out-of-phase with the phase reference signal through apertures 22a-22d. The latter apertures are accordingly displaced from apertures 20a-20d by a whole number multiple of one-half the wavelength of the low frequency test signal.

Further elements of the distortion detecting apparatus are indicated in FIG. 5. A wall 36 provides a stop which facilitates simple insertion of the film. Wall 36 is positioned so that the film can be properly aligned with respect to the optical elements merely by sliding it into the distortion detecting apparatus until it abuts the wall. Sprockets 38 of a sprocket wheel extend through corresponding sprocket holes in the film to move the film under the light beam. The sprocket wheel can be motor controlled, or alternately the film can simply be pulled under the light beam by hand, or the mask or even the light source moved or oscillated.

In the embodiment shown, which is designed for 35 mm sound track, apertures 20a-20d are approximately equal in length to the width of the sound track, which is 0.09 inches. They are 0.02 inches wide, which compares with a wavelength of 0.045 inches for 400 hertz low frequency test and crossmodulation residual signals.

Figure 6:
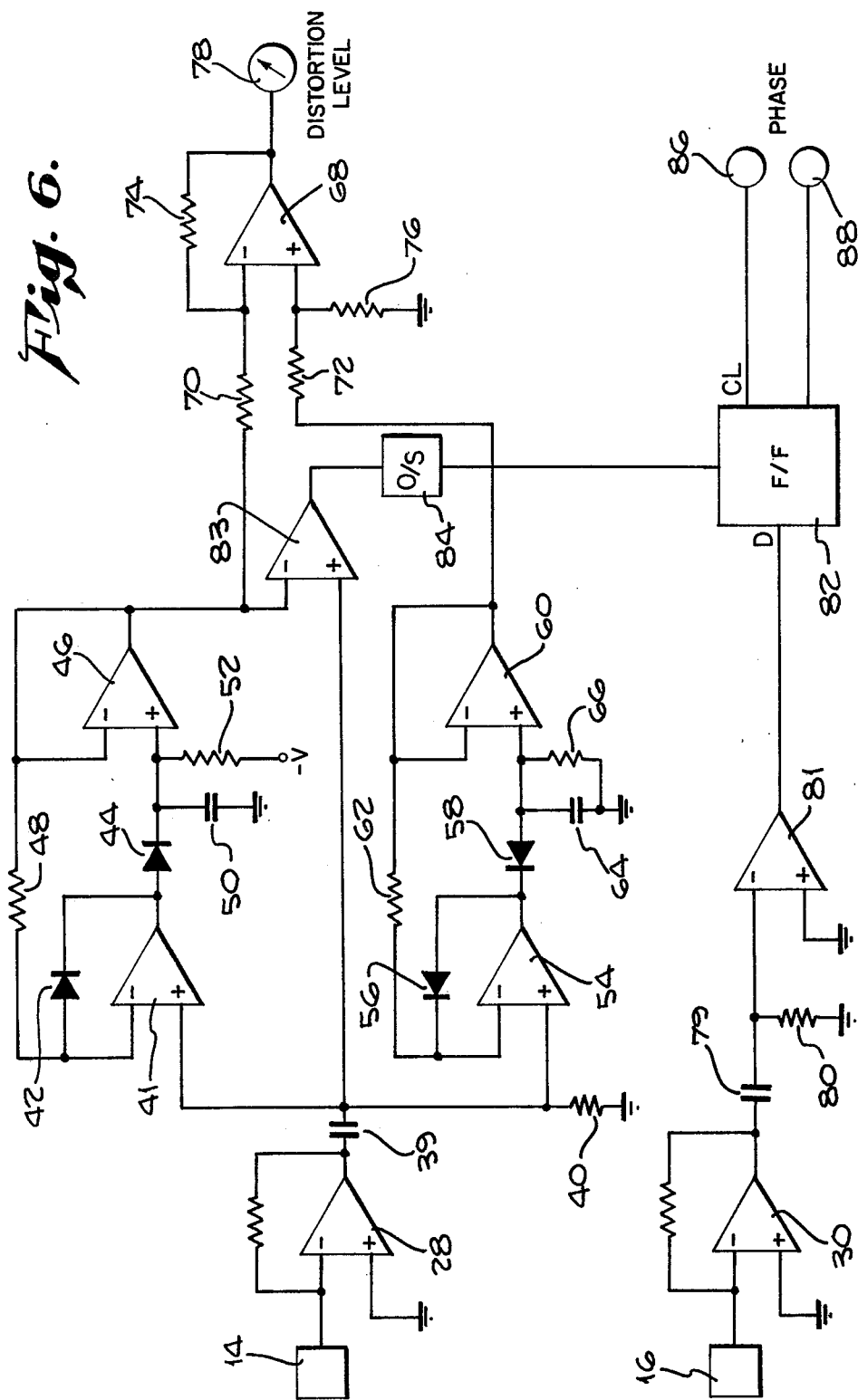
FIG. 6 is a schematic diagram of output circuitry for the embodiment shown in FIG. 3.

The output circuit which provides an indication of both the amplitude and phase of the crossmodulation distortion is shown in FIG. 6. The signal produced by photocell 14 is amplified by amplifier circuit 28, at the output of which is capacitively coupled by capacitor 39 to a positive peak follower circuit and a negative peak follower circuit. Capacitor 39 removed DC bias from the signal. A resistor 40 is connected between the capacitor output and ground. The positive peak follower circuit includes operational amplifier 41 having its positive input terminal connected to capacitor 39, its negative input terminal connected in a feedback loop through diode 42, and its output connected through another diode 44 which conducts current towards the positive input to operational amplifier 46. The output of amplifier 46 is connected in a first feedback loop back to its negative input, and in a second feedback loop through resistor 48 to the negative input for amplifier 41. A capacitor 50 and resistor 52 are connected to ground from the positive input of amplifier 46, providing controlled decay for that input signal.

The negative peak follower circuit is designed similarly to the positive peak follower circuit, and comprises operational amplifier 54 with its positive input terminal connected to the output of amplifier 28, feedback diode 56, diode 58 between the output of amplifier 54 and the positive input of operational amplifier 60, feedback resistor 62, and capacitor 64 and resistor 66 connected to ground from the positive input of amplifier 60. The negative peak follower circuit is identical to the positive peak follower circuit, with the exception of diodes 56 and 58 being reversed in the direction of conduction.

The outputs of the positive and negative peak follower circuits are respectively connected to the negative and positive input terminals of a differential amplifier 68 through resistors 70 and 72. The negative input to amplifier 68 is connected through resistor 74 in a feedback circuit to the amplifier's output, while the positive input terminal is connected through resistor 76 to ground. At the output of amplifier 68 is a meter 78 which indicates the difference between the signals held by the positive and negative peak follower circuits. Since this difference is proportional to the variation in light transmitted to photocell 14 as the test sound track is moved with respect to the beam from light source 8, it provides an indication of the amount of any residual crossmodulation distortion on the sound track.

The output from phase reference photocell 16 is processed through amplifier 30, and has its DC bias removed by capacitor 79 and resistor 80. It is then applied to a comparator 81, which determines whether the applied signal is positive or negative. The output of comparator 81 is connected to the D (data) input of a D type flip flop circuit 82. The clock input to flip-flop 82 is provided by a comparator 83 and one-shot circuit 84. Comparator 83 has its positive input connected to the output of amplifier 28, and its negative input connected to the positive input of amplifier 46. When the output of positive peak follower amplifier 41 exceeds its input, one-shot circuit 84 delivers a pulse to the clock input of flip-flop 82, which then captures the polarity of the output of comparator 81. Flip-flop 82 is connected to an output device such as a pair of lamps 86 and 88, one or the other of which will light to indicate whether the crossmodulation distortion signal from photocell 14 is in-phase or out-of-phase with the reference signal at photocell 16. With this information, it can be determined whether the film is overexposed or under exposed.

One of the advantages of the present invention lies in the fact that information on crossmodulation distortion can be provided from only one or a few wavelengths of the low frequency test signal, in contrast to the prior art technique in which several feet of film leader was typically devoted to crossmodulation distortion testing. Furthermore, the present apparatus can be used in a diagnostic capacity to determine malfunctioning of the processing equipment. For example periodic defocusing, which was only detected with the prior art technique insofar as it affected the average value of the crossmodulation distortion, can now be identified and measured. Periodic defocus results from variations in the film dynamics, and is frequently associated with a periodic condition of poor contact between the negative and print in the printing process. In one case, the continuous monitoring of crossmodulation distortion made possible by the present invention was used to detect a periodic varation in the distortion level. This was traced to a defect in a sprocketless printer wheel, used to move the film through the processing apparatus, which had a circumference equal to the distance between the periodic distortions.

While ideally the distortion detecting apparatus should respond only to the low frequency or crossmodulation distortion signal, which is 400 hertz in the described embodiment, in practice there is a gap in the frequencies present on the sound track between the low and high test frequency areas (except for spurious signals caused by pinholes, dust, etc.) Accordingly, it is within the scope of the invention to provide a low pass system which responds to all frequencies substantially below the high frequency level, rather than a band pass system as described herein.

Figure 7:
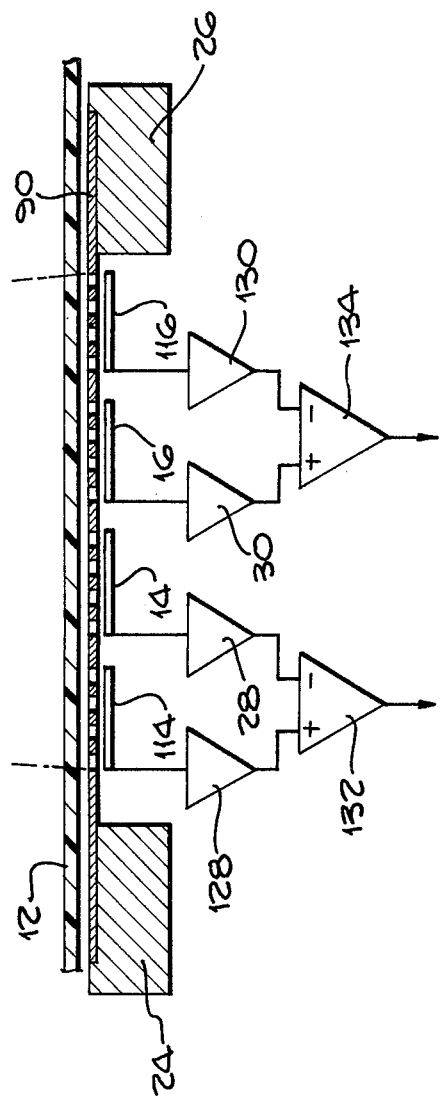
FIG. 7 is an elevation view illustrating another embodiment of the invention.
Figure 8:
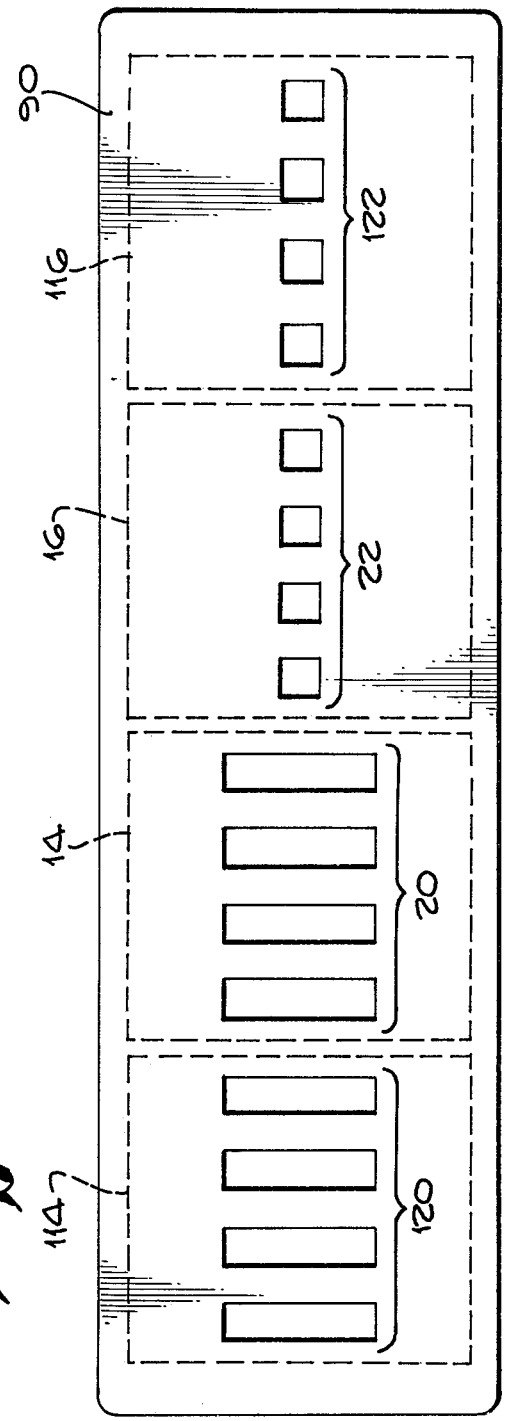

Referring now to FIGS. 7-10, another embodiment of the invention is shown which enhances the resolution of the crossmodulation distortion detection. A mask member 90 is shown in FIG. 8 which is similar to mask member 18 of FIG. 4. The same reference numerals are used to indicate corresponding portions of both masks. Primary groups of large and small apertures 20 and 22, respectively, are provided in mask 90 with the same dimensions and relative spacing as for mask 18. Spaced on the side of aperture group 20 away from group 22 by a predetermined distance, which is out-of-phase with respect to the low frequency test signal, is a secondary group of apertures 120. The latter apertures are substantially identical to those in primary aperture group 20. A secondary group of phase reference apertures 122 is provided on the opposite side of primary phase reference aperture group 22, and is displaced from group 22 by the same spacing as between primary and secondary groups 20 and 120. Secondary aperture groups 20 and 122 are each preferably spaced from their respective primary aperture groups 20 and 22 a whole number multiple of one-half by the wavelength of the low frequency test signal.

FIG. 7 is similar to FIG. 3, showing mask member 90 positioned in the testing apparatus. In addition to photocells 14 and 16, additional photocells 114 and 116 are aligned under aperture groups 120 and 122, respectively. The light transmitted through the film sound track from light source 8 and lens 10 (not shown) thus follows primary paths corresponding to aperture groups 20 and 22, and secondary paths corresponding to aperture groups 120 and 122. Amplifiers 28, 30, 128 and 130 receive signals from photocells 14, 16, 114 and 116, respectively. Difference amplifiers 132 and 134 receive inputs from amplifiers 28 and 128, and amplifiers 30 and 130, respectively.

FIG. 9 is a view similar to FIG. 5, showing a strip of film with a test sound track overlaying mask member 90. With aperture group 20 180 degrees out of phase with group 120 and aperture group 22 180 degrees out of phase with group 122 as shown, it can be seen that as a primary aperture is aligned with a portion of the sound track at which the high frequency signal lobe is expanding in amplitude, the corresponding secondary group of apertures will be aligned with a portion of the test track at which the high frequency lobe is decreasing in modulated amplitude. Thus, any difference in the amount of light transmitted through aperture groups 20 and 120 and received by photocells 14 and 114 indicates the presence of crossmodulation distortion, with the amount of difference increasing in proportion to the amount of distortion present.

Phase reference aperture groups 22 and 122 will similarly provide a difference signal at the output of amplifier 134 which acts as a phase reference for the distortion amplitude signal at the output of amplifier 132. Aperture groups 22 and 122 are located on the mask respectively in-phase with aperture groups 120 and 20, thereby enabling a direct comparison between the derived crossmodulation distortion signal and the phase reference signal. A different spacing could be used between the phase reference and distortion amplitude apertures, with phase compensation apparatus added to the output stage to compensate for the difference in phase.

Output circuitry for this embodiment is shown in FIG. 10, in somewhat more block diagram form than the circuit of FIG. 6. Difference amplifier 132 produces a signal proportional to the difference between the outputs of distortion amplitude photocell amplifiers 28 and 128. Its output is connected to a peak follow and hold circuit 136, which is turn has its output connected to sample and hold circuit 138. A comparator amplifier 140 also receives the output of difference amplifier 132, and is connected to reset peak follow and hold circuit 136 to zero volts when the output of difference amplifier 132 becomes less than zero volts.

The output of peak follow and hold circuit 136 is also connected to one input of a comparator 141, which in turn has its output connected to the input to a and one-shot circuit 142. The other input to comparator 141, is connected to the output of difference amplifier 132. When the output of peak follow and hold circuit 136 exceeds its input, one-shot circuit 142 produces a pulse which is delivered to sample and hold circuit 138, causing it to sample the output of peak follower circuit 136. This signal level is then delivered to an appropriate readout device such as meter 144. It is a feature of the invention that a readout is obtained independent of the film speed, allowing the film to be simply moved by hand without the speed control required in the prior art.

Difference amplifier 134 receives the outputs of phase reference amplifiers 30 and 130, and in turn has its output connected to a comparator 146 which detects whether the difference signal is positive or negative. The output of comparator 146 is connected to the D input of a D type flip-flop 148. The clock input to flip-flop 148 is connected to the output of one-shot circuit 142, in common with the clock input to sample and hold circuit 138. Thus, the polarity of the output of comparator 146 is captured by flip-flop 148 at the same time sample and hold circuit 138 receives an updated peak signal. The relative phase relationship is displayed by a pair of lamps 150 and 152 or other convenient display means, as in the first embodiment described above.

Various type of readouts can be employed with the distortion detecting apparatus. For example, the first embodiment described above provides an analog reading of distortion level with meter 78, while the second embodiment provides a digital readout with meter 144. The readout device is preferrably graduated in terms of percentage crossmodulation distortion, and with a digital readout the output can be updated at intervals corresponding to the wavelength of the low frequency modulating signal. Other readout means can be envisioned, such as storing the output signals in a computer and providing a printout in graph format.

While particular embodiments of the invention have been shown and described, numerous variations may occur to those skilled in the art. For example, the implementation shown herein is intended for 35 mm dual bilateral optical soundtracks; the dimensions and locations of the mask apertures can be adjusted for other types of films, optical soundtracks or test signals. Also, many variations in the number, order or spacing of the mask apertures may be made while still employing the teachings of the invention, or a mask can be dispensed with altogther and appropriate reflecting, focusing or other means employed to direct the light through the desired areas on the sound track. It is accordingly intended that the invention be limited only in terms of the appended claims.

I claim:

1. Apparatus for detecting cross modulation distortion on a film bearing an optical sound track having a high frequency test signal modulated by a low frequency test signal, comprising:
    a light source,
    a first light detection means positioned to receive light transmitted from the source,
    means for positioning the film with its sound track in the light path between the light source and first light detection means, said positioning means enabling relative movement between the film and the light path along the sound track,
    light control means controlling the transmission of light along said light path through at least one first predetermined area on the sound track, said at least one first area being defined by a position on the sound track and sufficiently large dimensions such that, during relative movement between the film and the light path along the sound track, the amount of light received by the first detection means is substantially independent of the high frequency test signal and varies substantially only in accordance with the amount of crossmodulation distortion on the sound track, and
    first output means for detecting variations in the amount of light transmitted through the sound track to the first detection means during such relative movement between the film and the light path, thereby providing an indication of the crossmodulation distortion on the sound track which is substantially independent of the speed of relative movement between the film and the light path.

2. Apparatus for detecting crossmodulation distortion on a film bearing an optical sound track having a high frequency test signal modulated by a low frequency test signal, comprising,
    a light source,
    a first light detection means positioned to receive light transmitted from the source,
    means for positioning the film with its sound track in the light path between the light source and first light detection means, said positioning means enabling relative movement between the film and the light path along the sound track,
    light control means controlling the transmission of light along said light path through at least one first predetermined area on the sound track, said at least one first area being defined by a position on the sound track and having a width along the sound track at least equal to at least one wavelength of the high frequency test signal whereby, during relative movement between the film and the light path along the sound track, the amount of light received by the first detection means varies substantially only in accordance with the amount of crossmodulation distortion on the sound track, and
    first output means for detecting variations in the amount of light transmitted through the sound track to the first detection means during such relative movement between the film and the light path, thereby providing an indication of the crossmodulation distortion on the sound track.

3. The crossmodulation distortion detecting apparatus of claim 1 or 2, said light control means controlling the transmission of light along said light path through a plurality of first predetermined discrete areas on the sound track, each of said first areas being defined by such position and dimensions, said first areas being mutually spaced along the sound track at substantially whole number multiples of the wavelength of the low frequency test signal.

4. The crossmodulation distortion detecting apparatus of claim 3, said light control means comprising an opaque mask member having a plurality of apertures therein respectively enabling the transmission of light through said first discrete areas on the sound track to the first light detection means.

5. The crossmodulation distortion detecting apparatus of claim 2, said light control means comprising an opaque mask member having an aperture therein enabling transmission of light through said first area on the sound track to the first light detection means.

6. The crossmodulation distortion detecting apparatus of claim 1 or 2,
further comprising a second light detection means positioned to receive light transmitted through the film from the source,
said light control means further controlling transmission of light through at least one second predetermined area on the sound track, said at least one second area being defined by a position on the high frequency signal portion of the sound track and dimensions such that, during relative movement between the film and the light path along the sound track, the amount of light received by the second detection means varies periodically at the frequency of the low frequency test signal and in known phase relationship therewith, said at least one second area being displaced a predetermined distance along the sound track from the at least one first area, and
second output means providing an indication of periodic variations in the amount of light received by the second detecting means, and thereby providing a phase reference for the crossmodulation distortion detected by the first detecting means, to enable the relative exposure of the film to be determined.

7. The crossmodulation distortion detecting apparatus of claim 6, said light control means controlling the transmission of light along said light path through a plurality of second predetermined discrete areas on the sound track, each of said second areas being defined by such position and dimensions, said second areas being mutually spaced along the sound track by substantially whole number multiples of the wavelength of the low frequency test signal.

8. The crossmodulation distortion detecting apparatus of claims 7 or 6, said light control means comprising an opaque mask member having apertures therein respectively enabling the transmission of light through said second areas on the sound track to the second light detection means.

9. Apparatus for detecting crossmodulation distortion on a film bearing an optical sound track having a high frequency test signal modulated by a low frequency test signal, comprising:
a light source,
a first light detection means positioned to receive light transmitted from the source,
means for positioning the film with its sound track in the light path between the light source and first light detection means, said positioning means enabling relative movement between the film and the light path along the sound track,
light control means controlling the transmission of light along said light path through a first predetermined area on the sound track, said first area being defined by a position on the sound track and having a dimension along the sound track substantially equal to a whole number multiple of the wavelength of the high frequency test signal whereby, during relative movement between the film and the light path along the sound track, the amount of light received by the first detection means varies substantially only in accordance with the amount of crossmodulation distortion on the sound track, and
first output means for detecting variations in the amount of light transmitted through the sound track to the first detection means during such relative movement between the film and the light path, thereby providing an indication of the crossmodulation distortion on the sound track.

10. The crossmodulation distortion detecting apparatus of claims 2 or 9, said light control means controlling the transmission of light through a first area on the sound track having a dimension along the sound track which is substantially greater than the wavelength of the high frequency test signal.

11. Apparatus for detecting crossmodulation distortion on a film bearing an optical sound track having a high frequency test signal modulated by a low frequency test signal, comprising:
a light source,
a first light detection means positioned to receive light transmitted from the source,
means for positioning the film with its sound track in the light path between the light source and first light detection means, said positioning means enabling relative movement between the film and the light path along the sound track,
light control means controlling the transmission of light along said light path through a first predetermined area on the sound track, said first area being defined by a position on the sound track and dimensions such that, during the relative movement between the film and the light path along the sound track, the amount of light received by the first detection means varies substantially only in accordance with the amount of crossmodulation distortion on the sound track,
first output means for detecting variations in the amount of light transmitted through the sound track to the first detection means during such relative movement between the film and the light path, thereby providing an indication of the crossmodulation distortion on the sound track,
a second light detection means positioned to receive light transmitted through the film from the source,
said light control means further controlling transmission of light through a second predetermined area on the sound track, said second area being defined by a position on the high frequency signal portion of the sound track and dimensions such that, during relative movement between the film and the light path along the sound track, the amount of light received by the second detection means varies periodically at the frequency of the low frequency test signal and in known phase relationship therewith, said second area being displaced a predetermined distance along the sound track from the first area, and
second output means providing an indication of periodic variations in the amount of light received by the second detecting means, and thereby providing a phase reference for the crossmodulation distortion detected by the first detecting means, to enable the relative exposure of the film to be determined.

12. The crossmodulation distortion detecting apparatus of claim 11, further comprising means for phase comparing the outputs of the first and second output means, thereby providing an indication of the relative exposure of the film.

13. The crossmodulation distortion detecting apparatus of claim 11, said light control means controlling the transmission of light through said second area on the sound track to clip the high frequency test signal and deliver a rectified light signal to the second light detecting means.

14. The crossmodulation distortion detecting apparatus of claim 11, said second area being displaced from the first area on the sound track by a whole number multiple of one-half the wavelength of the low frequency test signal.

15. Apparatus for detecting crossmodulation distortion on a film bearing an optical sound track having a high frequency test signal modulated by a low frequency test signal, comprising:
a light source,
a first light detection means positioned to receive light transmitted from the source,
means for positioning the film with its sound track in the light path between the light source and first light detection means, said positioning means enabling relative movement between the film and the light path along the sound track,
light control means controlling the transmission of light along said light path through a first predetermined area on the sound track, said first area being defined by a position on the sound track and dimensions such that, during relative movement between the film and the light path along the sound track, the amount of light received by the first detection means varies substantially only in accordance with the amount of crossmodulation distortion on the sound track, and
first output means for detecting variations in the amount of light transmitted through the sound track to the first detection means during such relative movement between the film and the light path, thereby providing an indication of the crossmodulation distortion on the sound track, said first output means comprising a peak follower means for detecting positive and negative peaks in the output of the first light detection means, and means for detecting the difference between positive and negative peaks to provide an indication of the gross crossmodulation distortion.

16. Apparatus for detecting crossmodulation distortion on a film bearing an optical sound track having a high frequency test signal modulated by a low frequency test signal, comprising:
a light source,
primary and secondary light detection means positioned to receive light transmitted from the source,
means for positioning the film with its sound track in the light path between the light source and said primary and secondary light detection means, said positioning means enabling relative movement between the film and the light path along the sound track,
light control means controlling the transmission of light along primary and secondary light paths respectively to said primary and secondary light detection means through at least one primary area and at least one predetermined secondary area on the sound track, said at least one primary area being defined by a position on the sound track and dimensions such that, during relative movement between the film and the primary light path along the sound track, the amount of light received by the primary light detection means varies substantially only with the amount of crossmodulation distortion on the sound track,
said at least one secondary area being displaced along the sound track from a respective primary area by a predetermined distance which is out-of-phase with respect to the wavelength of the low frequency test signal, and being defined by dimensions such that, during said relative movement between the film and the secondary light path, the amount of light received by the secondary light detection means varies substantially only with the amount of crossmodulation distortion on the sound track, but out of phase with the light received by the primary light detection means,
said at least one primary and secondary areas each comprising a plurality of predetermined discrete areas on the sound track, each of said discrete primary and secondary areas being defined by such respective positions and dimensions, said discrete primary areas being mutually spaced along the sound track at substantially whole number multiples of the wavelength of the low frequency test signal, and said discrete secondary areas also being mutually spaced along the sound track at substantially whole number multiples of the wavelength of the low frequency test signal, and
output means for comparing the light received by said primary and secondary light detectors during such relative movement between the film and the light paths, thereby providing an indication of the crossmodulation distortion of the sound track.

17. Apparatus for detecting crossmodulation distortion on a film bearing an optical sound track having a high frequency test signal modulated by a low frequency test signal, comprising:
a light source,
primary and secondary light detection means positioned to receive light transmitted from the source,
means for positioning the film with its sound track in the light path between the light source and said primary and secondary light detection means, said positioning means enabling relative movement between the film and the light path along the sound track,
light control means controlling the transmission of light along primary and secondary light paths respectively to said primary and secondary light detection means through respective predetermined primary and secondary areas on the sound track, said primary area being defined by a position on the sound track and dimensions such that, during relative movement between the film and the primary light path along the sound track, the amount of light received by the primary light detection means varies substantially only with the amount of crossmodulation distortion on the sound track,
said secondary area being displaced along the sound track from the primary area a predetermined distance which is out-of-phase with respect to the wavelength of the low frequency test signal, and being defined by dimensions such that, during said relative movement between the film and the secondary light path, the amount of light received by the secondary light detection means varies substantially only with the amount of crossmodulation distortion on the sound track, but out of phase with the light received by the primary light detection means, and output means for comparing the light received by said primary and secondary light detectors during such relative movement between the film and the light paths, thereby providing an indication of the crossmodulation distortion of the sound track.

18. The crossmodulation distortion detecting apparatus of claim 17, wherein said primary and secondary predetermined areas on the sound track are mutually out-of-phase by an odd number multiple of the wavelength of the low frequency test signal.

19. The crossmodulation distortion detecting apparatus of claim 17, said primary and secondary areas on the sound track each having a dimension along the sound track substantially equal to a whole number multiple of the wavelength of the high frequency test signal.

20. The crossmodulation distortion detecting apparatus of claim 17, further comprising:

primary and secondary phase reference light detection means positioned to receive light transmitted through the film through the source, said light control means further controlling the transmission of light through predetermined primary and secondary phase reference areas on the sound track, said primary and secondary phase reference areas each being defined by positions on the high frequency signal portion of the sound track and dimensions such that, during relative movement between the film and the light path along the sound track, the amounts of light received by the primary and secondary phase reference light detection means vary periodically at the frequency of the low frequency test signal and in known phase relationship therewith, said primary and secondary phase reference areas being displaced by equal predetermined distances along the sound track from said primary and secondary areas, respectively, and, phase reference output means providing an indication of periodic variations in the amount of light received by said primary and secondary phase reference light detecting means, and thereby providing a phase reference for the crossmodulation distortion detected by the primary and secondary light detecting means, to enable the relative exposure of the film to be determined.

21. The crossmodulation distortion detecting apparatus of claim 20, said light control means controlling the transmission of light through said primary and secondary phase reference areas on the sound track to clip the high frequency test signal, and thereby deliver rectified light signals to the primary and secondary phase reference light detecting means.

22. The cross modulation distortion detecting apparatus of claim 20, said primary and secondary phase reference areas being respectively displaced from the primary and secondary areas on the sound track by a whole number multiple of one half the wavelength of the low frequency test signal.

23. The cross modulation distortion detecting apparatus of claims 17, 16 or 20, said light control means comprising an opaque mask member having apertures therein respectively enabling the transmission of light through said areas on the sound track to their respective light detection means.

24. The method of detecting crossmodulation distortion on a film bearing an optical sound track having a high frequency test signal modulated by a low frequency test signal, comprising:

forming a light beam, transmitting said light beam through the sound track, controlling the transmission of the light beam so that it passes through at least one predetermined area on the sound track, receiving light transmitted through said predetermined areas on the sound track, providing relative movement between the film and the light path along the sound track, and detecting variations in the amount of received light during relative movement between the film and light path, said first predetermined areas having a width along the sound track equal to at least one wavelength of the high frequency test signal, whereby the detected light variations during relative movement between the film and light path provide an indication of the amount of crossmodulation distortion on the sound track.

25. The method of claim 24, said predetermined area of the sound track having a dimension along the sound track substantially equal to a whole number multiple of the wavelength of the high frequency test signal.

26. The method of claim 24 or 25, said predetermined area having a dimension along the sound track which is substantially greater than the wavelength of the high frequency test signal.

27. The method of claim 24, said predetermined area comprising a plurality of discrete areas mutually spaced along the sound track at substantially whole number multiples of the wavelength of the low frequency test signal.

28. The method of claim 24, further comprising the steps of transmitting light through a second predetermined area on the sound track, which area exhibits a periodic variation in transmittance at the frequency of the low frequency test signal, and of receiving light transmitted through second area to provide a phase reference for the crossmodulation distortion information transmitted through the first area.

29. The method of claim 28, said second area being displaced from the first area on the sound track by a whole number multiple of onehalf the wavelength of the low frequency test signal.

30. The method of claim 28, said second area comprising a plurality of discrete areas mutually spaced along the sound track by substantially whole number of multiples of the wavelength of the low frequency test signal.

31. The method of claim 24, wherein transmission of the light beam is controlled by passing the beam through an opaque mask member having at least one aperture therein enabling transmission of light through said predetermined areas on the sound track.

32. The method of detecting crossmodulation distortion on a film bearing an optical sound track having a high frequency test signal modulated by a low frequency test signal, comprising:

forming a light beam, transmitting said light beam through the sound track, controlling the transmission of the light beam so that it passes through at least one predetermined primary area on the sound track, said at least one predetermined area being of sufficient dimensions to respond substantially only to the crossmodulation distortion signal during relative movement between the film and light path, receiving the light transmitted through said at least one primary area on the sound track, transmitting a beam of light and controlling the beam so that it passes through at least one secondary predetermined area on the sound track, said at least one secondary area being displaced along the sound track from a respective primary area by a predetermined distance which is out-of-phase with respect to the wavelength of the low frequency test signal, and being defined by dimensions such that, during relative movement between the film and the light beam, the amount of light transmitted through said at least one secondary area varies substantially only with the amount of crossmodulation distortion on the sound track, but out-of-phase with the light transmitted through the at least one primary area, receiving the light transmitted through the at least one secondary area on the sound track, providing relative movement between the film and the light path along the sound track, and comparing the light received from the primary and secondary areas on the sound track to provide an indication of the crossmodulation distortion.

33. The method of claim 32, wherein said primary and secondary predetermined areas on the sound track are mutually out-of-phase by substantially an odd number multiple of one-half the wavelength of the low frequency test signal.

34. The method of claim 33, each of said at least one primary and secondary areas on the sound track comprising a plurality of discrete areas mutually spaced along the sound track at substantially whole number multiples of the wavelength of the low frequency test signal.

* * * * *